United States Patent [19]

Shibue et al.

[11] Patent Number: 4,554,175
[45] Date of Patent: Nov. 19, 1985

[54] METHOD OF PRODUCING SUPPORT FOR PHOTOGRAPHIC PAPER

[75] Inventors: Toshiaki Shibue; Koichi Nagayasu, both of Hino, Japan

[73] Assignee: Konishiroku Photo Industry Co., Ltd., Tokyo, Japan

[21] Appl. No.: 589,876

[22] Filed: Mar. 15, 1984

[30] Foreign Application Priority Data

Mar. 28, 1983 [JP] Japan .................................. 58-53042
Mar. 29, 1983 [JP] Japan .................................. 58-54948

[51] Int. Cl.$^4$ .............................................. B05D 3/06
[52] U.S. Cl. ....................................... 427/44; 427/355; 427/359; 427/361; 427/362; 427/365; 427/371
[58] Field of Search ................... 427/44, 35, 355, 359, 427/361, 362, 365, 371

[56] References Cited

U.S. PATENT DOCUMENTS 3,628,987 12/1971 Nakata et al. ..................... 427/208.8
4,435,461 3/1984 Gray et al. ............................ 427/44

Primary Examiner—Richard Bueker
Attorney, Agent, or Firm—Frishauf, Holtz, Goodman & Woodward

[57] ABSTRACT

Disclosed is a method of producing a support for a photographic paper, which comprises applying primary irradiation of electron beams to at least one coated layer formed on one side or both sides of a substrate and curable by irradiation of electron beams, bringing the surface of said coated layer into contact with a form member and then peeling it from the form member, followed by applying secondary irradiation of electron beams to the coated layer. The primary irradiation is carried out in the manner that the surface of the coated layer may hold shapes substantially corresponding to shapes on the surface of the form member at the stage where the coated layer has been peeled off from the form member.

17 Claims, 7 Drawing Figures

METHOD OF PRODUCING SUPPORT FOR PHOTOGRAPHIC PAPER

BACKGROUND OF THE INVENTION

This invention relates to a method of producing a support or base for a photographic paper, utilizing especially the irradiation by electron beams.

In a conventional support for a photographic paper, which is comprised of a layer coated with a polyolefin resin, the coated layer is formed on the surface of a paper substrate by the use of a die and in a molten state at about 300° C. Therefore, it has drawbacks that the surface of the paper substrate is deformed, the surface quality becomes inferior, and the mirror finishing can be impaired.

Moreover, when the polyolefin resin is applied to form a thin coated layer, it is required for the resin to be applied at a higher temperature, whereby polyolefin itself tends to be pyrolyzed and the layer may yellow and develop pinholes.

Furthermore, while it is preferred for the coated layer to contain a white pigment, the content thereof can not be made large enough when it is dispersed in a molten polyolefin resin, because of low dispersibility of the pigment. Thus the sharpness of photographs becomes insufficient.

In order to eliminate these drawbacks, there has been proposed a method in which a coated layer curable by irradiation with electron beams is formed on a paper substrate and then is allowed to cure by irradiating with the electron beams (Japanese Unexamined Patent Publications Nos. 27257/1982, 30830/1982 and 49946/1982).

According to such a method, the coating and the curing are carried out at a room temperature. Therefore, the surface of the paper substrate is free from the roughness and the development of pinholes. Also, in this method, white pigment is dispersed at a room temperature, and therefore the content of the pigment can be made large enough because of good dispersibility. The sharpness of photographs also can be improved. However, by applying only such irradiation of electron beams as mentioned above, the smoothness of the coated layer can not be sufficient and also desired embossing can not be effected on the surface of the coated layer.

As a way to solve such a problem, there is disclosed in the aforesaid Japanese Unexamined Patent Publication No. 30830/1982 a method in which, the coated layer is pressed against a highly glossy roll under low pressure, is allowed to cure by irradiating electron beams from the rear surface of paper substrate while it is in contact with a form (or emboss) face of the roll, and then is peeled from the form face.

In such a method, however, which is carried out by irradiating the electron beams during contact of the layer with a form member, the coated layer partially remain unpeeled from the surface of the form member, so that the quality is lowered and the productivity becomes inferior. In particular, when concavo-convex embossing is to be effected, it is difficult for such a method to be put into practice because the adherance of coated substance to the form face occurs very frequently.

Moreover, the material capable of curing by irradiation of electron beams is usually adverse to the presence of oxygen and therefore the irradiation is always carried out in an inert gas or the like. Accordingly, the above method requires the roll to be located in an irradiation zone, necessitates a device to be of a large-size, and results in a poor removal rate of oxygen in the irradiation zone. It also results in increased amount of inert gas and poor economic efficiency, and also it sometimes can not achieve sufficient curing.

In the field of printing, there is also known a method in which electron beams are irradiated during contact with a form member to carry out mirror finishing or concavo-convex finishing on the surface of a coated layer (Japanese Unexamined Publications Nos. 164816/1981, 21966/1982, 22204/1982 and 59667/1982). However, the same drawbacks as in the foregoing are inherent to this method.

SUMMARY OF THE INVENTION

This invention has been made in view of the circumstances mentioned above, and it is a principal object thereof to provide a method of producing a support for photographic paper which support for photographic paper is free from yellowing and development of pinholes, has very excellent face-forming precision and comprises a coated layer having a smooth or embossed face of high quality; and which method can produce a stable formed face, does not cause the adherance of coated substance to a form member, does not require a device of a large-size and attains very good productivity.

Such an object can be accomplished by this invention as described hereinbelow.

According to this invention, there is provided a method of producing a support for a photographic paper, which comprises applying primary irradiation of electron beams to at least one coated layer formed on one side or both sides of a substrate and curable by irradiation of electron beams, bringing the surface of said at least one coated layer into contact with a form member having shapes on the surface thereof and peeling off said coated layer from the form member, followed by applying secondary irradiation of electron beams to the coated layer; said primary irradiation being carried out so that the surface of the coated layer may hold shapes substantially corresponding to said shapes on the surface of the form member at the stage where the coated layer has been peeled off from the form member.

This invention will be described below in detail with reference to the accompanying drawings.

DETAILED DESCRIPTION OF THE PREFERRED EMBODIMENTS

Figure 1:
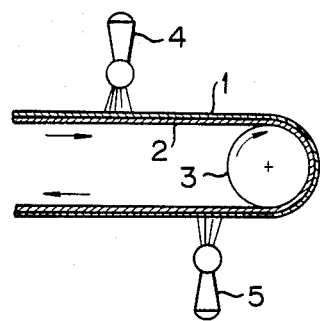
FIG. 1 to FIG. 7 each show an embodiment to carry out this invention.

In this invention, the primary irradiation of electron beams is carried out in the manner that an embossed surface on the coated layer may be substantially retained after the surface has been embossed by a form member after the primary irradiation and has been peeled off from the form member.

Dose of the primary irradiation can be adjusted suitably by varying the strength of irradiation, changing the distance of irradiation, carrying out the irradiation through a shielding material, or controlling the amount of oxygen. The dose of the irradiation can not be unequivocally defined because it may vary depending on the above manners for adjustment, kinds or thickness of a curable substance, or kinds or contents of a pigment. However, in general, a suitable dose (absorbed dose) should be in the range of from about 0.01 Mrad to 10 Mrad.

It is preferred to carry out such primary irradiation in an atmosphere of an inert gas or in vacuo. For the inert gas, there may be employed a nitrogen gas, a carbonic acid gas, an argon gas, a helium gas or the like.

The secondary irradiation of electron beams is carried out in a dose by which an embossed coated layer has completely cured in an inert gas atmosphere or in vacuo. By this irradiation, the reaction of radicals remained unreacted in the coated layer after the primary irradiation can be completed.

When necessary, after the second irradiation, tertiary and quarternary irradiations of electron beams may be further applied optionally or, alternatively, heating with hot wind or far infrared rays may also be applied.

The dose of the secondary irradiation should be in the range of in general from about 0.5 Mrad to 15 Mrad.

The primary irradiation and the secondary irradiation may be carried out either from the surface on which the coated layer on a substrate is provided or from the rear surface side thereof.

The form member used in this invention is defined to be a material whose surface has been provided with shaping processing, and may be exemplified by a roll or rolls whose surface(s) has or have been provided with mirror finishing as a means for enhancing the smoothness of the coated layer surface, or a roll or rolls whose surface(s) has or have been shaped with fine concavo-convex patterns as a means for providing the coated layer with desired embossing.

As for the kinds of embossing, there may be mentioned silk finishing, coarse face finishing, fine particle face finishing and so on, and desired embossing can be applied as necessary.

The above rolls may be produced by conventional known methods. Incidentally, an endless belt or the like may be used in place of a roll.

The pressure to be used when the coated layer is brought into contact with the form member may be optionally selected according to the kinds of the coated layer and the electron beams, but in general it is in the range of from 100 to 2000 g/cm$^2$.

The coated layer used in this invention and curable by irradiation of electron beams may comprise a compound having an unsaturated double bond or a composition containing the compound. Preferably, such a compound is a prepolymer and/or an oligomer having two or more of unsaturated double bonds, which may further contain a monomer (or vinyl monomer) having unsaturated double bond for the purpose of regulating the viscosity and the like of the composition.

As a preferred embodiment for the composition, there may be mentioned an embodiment where an inorganic white pigment is contained.

As the prepolymer or oligomer having two or more of unsaturated double bond, there may be used known prepolymers and oligomers as disclosed in the aforesaid Japanese Unexamined Patent Publication No. 30830/1982 or in other prior arts of related technical field.

Examples of such prepolymers or oligomers include the following:

(1) Unsaturated polyesters:

Compounds as disclosed in Japanese Patent Publications Nos. 23654/1973, 23293/1974, 47103/1974, 44572/1974, and Japanese Unexamined Patent Publication No. 7473/1979.

(2) Modified unsaturated polyesters:

Urethane-modified unsaturated polyesters, in particular, the compound as disclosed in Japanese Patent Publication No. 14467/1973.

Acrylic urethane-modified unsaturated polyesters, in particular, the compound as disclosed in Japanese Patent Publication No. 14790/1973.

Liquid unsaturated polymers having acrylic groups as terminal groups, in particular, the compound as disclosed in U.S. Pat. Nos. 3,455,802 and 3,485,732.

(3) Acrylate series polymers:

Polyester acrylates, e.g., polyester acrylate oligomer disclosed in A. C. J. Van Oosterhout and A. Van Neerbos, Double Liaison-Chim Peint, 27(295), 135 (1980).

Epoxy acrylates, e.g., the compound disclosed in Japanese Patent Publication No. 13023/1972 and Japanese Unexamined Patent Publication No. 162713/1982, namely, an epoxy acrylate obtained by adding to a polyfunctional epoxy compound an acrylic acid and other $\alpha$-, $\beta$-unsaturated carboxylic acid.

Silicone acrylates, e.g., a condensate of a hydroxyl group- or methoxy group-containing silicone with hydroxyethyl methacrylate as disclosed in Japanese Patent Publication No. 22172/1973 and Japanese Unexamined Patent Publication No. 3594/1973.

Urethane acrylates, such as those disclosed in U.S. Pat. Nos. 3,864,133; 3,891,523 and 3,912,516; Japanese Patent Publication No. 22172/1973, Japanese Unexamined Patent Publications Nos. 39594/1973 and 26337/1974, Japanese Patent Publication No. 35346/1974, Japanese Unexamined Patent Publication No. 96043/1974, Japanese Patent Publication No. 31239/1977, Japanese Unexamined Patent Publications Nos. 80394/1979, 129034/1979 and 127994/1979; more specifically, a urethane acrylate obtained by addition reaction of hydroxyethyl methacrylate with a polyfunctional isocyanate compound, a urethane acrylate obtained by reaction of a bisphenol A derivative with polyisocyanate and hydroxyl group-containing acrylate, an amidourethane acrylate obtained by reaction of an amide-containing compound having a hydroxyl functional group with a hydroxyl group-containing acrylate compound, and the like.

(4) Butadiene series polymers:

There may be mentioned a urethanated 1,2-polybutadiene disclosed in Japanese Unexamined Patent Publication No. 123187/1975, a modified polybutadiene formed by adding a monoester compound to an epoxydized polybutadiene and further adding an aliphatic lower carboxylic acid as disclosed in Japanese Unexamined Patent Publication No. 148094/1979.

The above compounds may be used singly or in combination of two or more kinds.

Number average molecular weight of these compounds should be in the range of from about 500 to 20,000, preferably, about 1,000 to 10,000.

Concentration of the inorganic white pigment to be blended with the prepolymer or oligomer as a preferred embodiment of the invention should be in the range of from about 10:1 to 1:1, preferably about 5:1 to 0.7:1 in the mixing weight ratio of these polymers to the pigment.

When the monomer having unsaturated bond is used, it is preferably contained in the weight ratio ranging from about 1:10 to 10:1 relative to the polymers. The monomer having unsaturated bond (e.g. a vinyl monomer) is mixed for the purpose of lowering the viscosity of a composition and enhancing the coating processability. This monomer contributes to the acceleration of the curing speed.

The monomer may be used singly, or mixture of two or more kinds of monomers may be used as necessary.

Typical examples of the monomers includes the following:

(a) Monofunctional monomers such as methyl acrylate, ethyl acrylate, butyl acrylate, 2-ethylhexyl methacrylate, 2-hydroxyethyl acrylate, 2-hydroxyethyl methacrylate, glycidylmethacrylate, n-hexyl acrylate and lauryl acrylate.

(b) Bifunctional monomers such as 1,6-hexanediol diacrylate, 1,6-hexanediol dimethacrylate, neopentyl glycol, 1,4-butanediol diacrylate, ethylene glycol diacrylate, polyethylene glycol diacrylate, pentaerithritol diacrylate and divinylbenzene.

(c) Trifunctional monomers or monomers having more functionalities, such as trimethylolpropane triacrylate, trimethylolpropane trimethacrylate, pentaerithritol triacrylate, dipentaerithritol hexaacrylate and an acrylic acid ester of ethylene diamine.

Preferred examples of the inorganic pigment include those disclosed in Japanese Unexamined Patent Publications Nos. 27257/2982 and 30830/1982, namely, $TiO_2$ (anatase type or rutile type), $ZnO_2$, $SiO_2$, $BaSO_4$, $CaSO_4$, $CaCO_3$, talc, clay, etc.

Uncurable binder may additionally be used if desired. For example, the binders as disclosed in Japanese Unexamined Patent Publication No. 30830/1982; namely, cellulose ester, polyvinyl butylal, polyvinyl acetate and a vinyl acetate series copolymer, a copolymer of styrol and an acrylic acid, a saturated or unsaturated polyester resin containing no styrol.

The substrate material to be used in this invention is in general made of paper, and those made of natural pulp, synthetic pulp or a mixture thereof may be used. For example, there may be used any paper having good flatness, such as photographic raw paper prepared by a conventional method, slick papers, etc. It is preferred for the paper to have thickness ranging from about 80 to 250 $\mu$m and to have a weighed amount of from about 80 to 200 $g/m^2$.

If desired, the substrate paper may be used by adding a paper strength reinforcing agent, a sizing agent, a colorant, a fluorescent whitener, etc.

A film made of polyester, polystyrene, etc. may be used in place of the above paper. Such a film may contain, or may not contain pigment.

As an electron beam accelerator used in this invention for allowing the coated layer to cure, there may be employed those of a Bandegraph type scanning system, a double scanning system and a curtain beam system. Of these, the most preferable system is the curtain beam system which is capable of obtaining a large generating power with relatively low cost.

As for the electron beam characteristic, it is desirable for the accelerator to have an acceleration voltage of from 100 to 1,000 KV, preferably 150 to 300 KV. This is because the dose of electron transmission becomes insufficient at lower than 100 KV and, on the other hand, too large to be economical at higher than 1,000 KV.

As the coating method useful in the invention to provide coated layer on the substrate, there may be employed any of blade coating, air-knife coating, gravure coating, reverse-roll coating, spray coating, flood coating, transfer-roll coating, etc.

The coating should be made in such an amount to form the coating thickness of from 3 to 80 $\mu$m, preferably 5 to 50 $\mu$m. This is because the thickness less than 3 $\mu$m may results in entire penetration of coating material into the substrate, poor smoothness, and difficulty in formation of a continuous film, or the thickness more than 80 $\mu$m may result in a non-uniform coating, requirement of a large energy for the curing, an economical disadvantage, and insufficient curing.

When the coated layer is comprised of a composition, dispersion of materials may be carried out by the use of a variety of kneading machines such as a twin-roll rollermill, a three-roll mill, a ball mill, a pebble mill, a kneader, a sand grinder, a high-speed impeller disperser, a high-speed stone mill, a high-speed impact grinder, a homogenizer, etc.

In this invention, the steps comprising the primary irradiation, the contact with and peeling off from a form member and the secondary irradiation may be carried out separately and sequentially on each sheet of substrates. Usually, however, it is preferred from a viewpoint of the productivity to carry out these steps in a continuous manner while forwarding a long-sized or belt-like substrate material provided with the coated layer or layers. Examples of the latter embodiment are shown in FIGS. 1 to 6.

In the case of the embodiment schematically shown in FIG. 1, a substrate material 1 (made of paper or plastic) provided on its one-side surface with a coated layer 2 curable by irradiation of electron beams is subjected to primary irradiation from the back side thereof by the use of an electron beam accelerator 4. The coated layer is then brought into contact with a form member 3 (e.g. a mirror face roller, a silk face, coarse face or fine particle face roller, etc.) to effect embossing, and is then peeled from the form member, followed by being further subjected to secondary irradiation from the opposite side of the coated layer by use of an electron beam accelerator 5 and thereafter rolled up.

Figure 2:
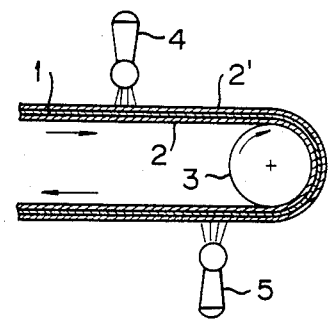

The embodiment schematically shown in FIG. 2 concerns a method in which employed is a substrate material 1 provided on its both surfaces with coated layers 2,2' capable of curing by irradiation of electron beams, and the same operations as in the case of the examples shown in FIG. 1 are performed to effect embossing on the coated layer 2.

Figure 3:
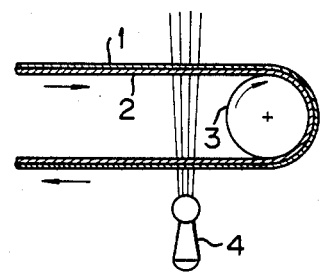
Figure 4:
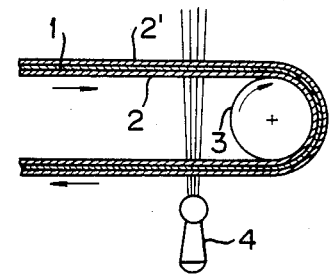

Each of the embodiments schematically shown in FIG. 3 and FIG. 4 is a method in which, explaining in reference to the examples shown in FIG. 1 and FIG. 2, the primary irradiation by the electron beam accelerator 4 is carried out not from the opposite side of the surface on which the coated layer is provided, but from the position where the electron beam accelerator 5 for the secondary irradiation is located, with use of such a larger dose of electron beams that the electron beams used for the secondary irradiation may transmit through the substrate material 1 made of paper or the like and the electron beams having transmitted through the substrate material 1 may be absorbed by the coated layer to effect the primary irradiation.

Figure 5:
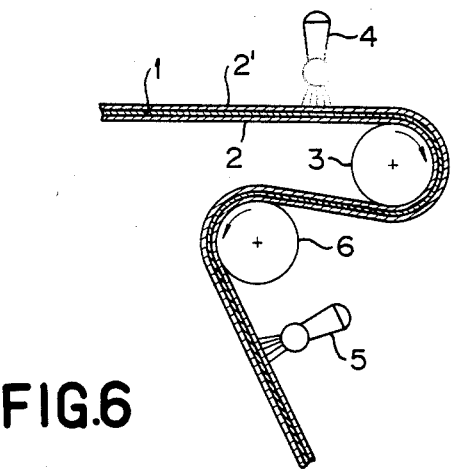

The embodiment schematically shown in FIG. 5 is an example in which the primary irradiation is carried out by an electron beam accelerator 4 on a support comprising a substrate material 1 provided on its both surfaces with coated layers 2 and 2', and thereafter single-face embossing is effected on the coated layer 2 by means of a form member 3, further embossing on the opposite side coated layer 2' by means of a form member 6, followed by the secondary irradiation by use of an electron beam accelerator 5 to complete the curing of the coated layers.

Figure 6:
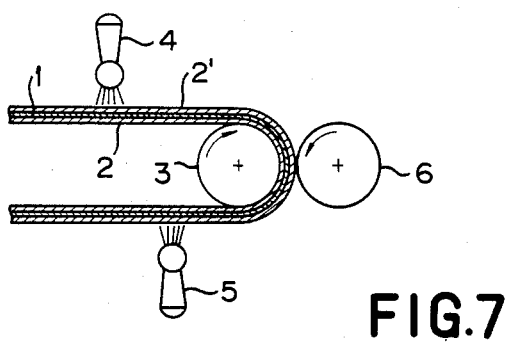

The embodiment schematically shown in FIG. 6 is an example in which coated layers 2 and 2' provided respectively on both surfaces of a substrate material 1 are subjected to the primary irradiation by use of an electron beam accelerator 4, and then to simultaneous embossing of both surfaces of the coated layers 2, 2' by means of a pair of form members 3 and 6, followed by the secondary irradiation using an electron beam accelerator 6 to complete the curing of the coated layers.

Figure 7:
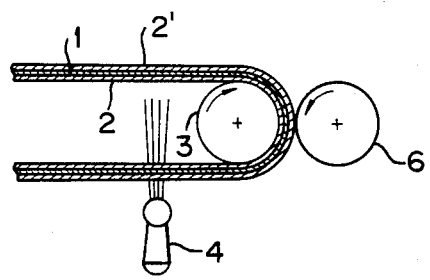

The embodiment schematically shown in FIG. 7 is an example in which compositions are coated on both surfaces of a substrate 1 to form coated layers 2, 2', and the primary irradiation thereon is carried out by using electron beams transmitted through from an electron beam accelerator 4 for secondary irradiation which corresponds to the accelerator 5 in FIG. 6, simultaneous embossing is then effected on both surfaces of the coated layers by means of form members 3 and 6, followed by the secondary irradiation using the electron beam accelerator 4 to complete the curing of the coated layers.

According to this invention, embossing and smoothening on the coated layer can be effected in very high precision and, moreover, in a stable manner. Also, the coated layer is substantially free from yellowing and development of pinholes. Further, there occurs no adhesion of coated materials to a form member. Still further, it is unnecessary to dispose the form member in a zone of electron beam irradiation, thereby requring no large-sized equipment.

Moreover, it is possible according to this invention to effect embossing and smoothening simultaneously and continuously on both the coated layers formed on both surfaces of a substrate material, whereby continuous operations can be simplified to produce great advantages in the production system. Conventionally, it was very difficult to effect such both side embossing.

Thus, there can be realized an advantageous method of producing a support very useful as a support for a photographic paper.

This invention will be described below in greater detail by illustrating working examples and comparative examples.

EXAMPLE 1

| | |
|---|---|
| Urethane acrylate oligomer (the one disclosed in U.S. Pat. No. 3,864,133) | 30 wt. % |
| 1,6-Hexanediol dimethacrylate | 30 wt. % |
| 2-Ethylhexyl acrylate | 20 wt. % |
| Hydroxyethyl methacrylate | 10 wt. % |
| Titanium dioxide (anatase type) | 30 wt. % |

A composition made of the above was dispersed in a ball mill for 16 hours, and then one side of a photographic raw paper having a weighed amount of about 180 g/m² was coated with it by means of a doctor coater to have the coated thickness of about 30 μm.

According to the method shown in FIG. 1, coated layer thus formed was subjected to primary irradiation of electron beams from the opposite surface of the paper substrate in a nitrogen gas atmosphere and under an accelarated voltage, in the manner that the absorbed dose of the electron beams reaches 0.5 Mrad.

Thereafter, the coated layer thus irradiated was brought into pressure contact with a chrome roller applied on its surface with silk embossing patterns (about 20 μm in depth), and peeled off from the embossing roller, followed immediately by secondary irradiation of electron beams on the embossed coated layer from the opposite side of the paper substrate in a nitrogen gas atmosphere, in the manner that the absorbed dose of the electron beams reached 3 Mrad, and then rolled up after having cured.

Subsequently, the opposite surface of the coated layer thus embossed was coated with a composition of the same preparation as mentioned above by means of a doctor blade to have the coated thickness of about 30 μm, which was followed by curing by irradiation of electron beams in a nitrogen gas atmosphere and in an absorbed, dose of 4 Mrad by the use of the electron beam accelerator 4 shown in FIG. 1, and then rolled up. Specimen thus obtained is designated as Sample No. 1.

Comparative Example 1

The same operations as in Example 1 were repeated, except that the primary irradiation was not carried out. Specimen thus obtained is designated as Sample No. 2.

Comparative Example 2

Both surfaces of a photographic raw paper having a weighed amount of about 180 g/m² were coated with a liquid composition of the same preparation with the one used in Example 1 by means of a doctor coater to have the coated thickness of about 40 μm each. One side of the coated layers thus formed was thereafter brought into contact with a roller having highly lustrous surface and having been cooled internally by using cooling water, under the pressure of 400 g/cm² as described in Japanese Unexamined Patent Publication No. 30830/1982, during which electron beams were irradiated from the opposite surface thereof in a nitrogen gas atmosphere and in an absorbed dose of 3.5 Mrad until the coated layer had cured, which was then peeled off from the roller and rolled up. Specimen thus obtained is designated as Sample No.3.

EXAMPLE 2

| | |
|---|---|
| Unsaturated polyester (a compound synthesized according to Synthesis Example 1 disclosed in Japanese Unexamined Patent Publication No. 7473/1979) | 35 wt. % |
| Ethylene glycol diacrylate | 35 wt. % |
| Trimethylolpropane triacrylate | 10 wt. % |
| Titanium dioxide (anatase type) | 35 wt. % |

A composition of the above ingredients was dispersed in a ball mill for 24 hours, and then both surfaces of a photographic raw paper having a weight amount of about 160 g/m² were coated with it by means of a doctor coater to have the coated thickness of about 40 μm each. According to the example shown in FIG. 2, the coated layers thus formed were subjected to primary irradiation of electron beams from the opposite surface of the paper substrate in a nitrogen gas atmosphere, in the manner that the absorbed dose of the electron beams reached 1 Mrad.

Then, the surface of one of the coated layers was brought into pressure contact with a chrome plated roller applied on its surface with mirror face finishing to make smooth the surface of the coated layer, and was peeled off from the roller. Immediately thereafter, coated layers were subjected to secondary irradiation of electron beams from the opposite side of the surface brought into contact with the mirror face roller in a nitrogen gas atmosphere, in the manner that the absorbed dose of the electron beams reached 4 Mrad, and then rolled up after having cured. Specimen thus obtained is designated as Sample No. 4.

Comparative Example 3

Both surfaces of a photographic raw paper having a weighed amount of about 160 g/m² were coated with a liquid composition of the same preparation with the one used in Example 2, by means of a doctor coater to have the coated thickness of about 40 μm. One side of the coated layers thus formed was thereafter brought into contact with a roller having highly lustrous surface and having been cooled internally by using cooling water, during which electron beams were irradiated from the opposite side thereof in a nitrogen gas atmosphere and in an absorbed dose of 5 Mrad until the coated layer had cured, which was then peeled off from the roller and rolled up. Specimen thus obtained is designated as Sample No. 5.

Surface shapes or state of these samples were observed. Results are shown in Table 1.

TABLE 1

| Sample No. | Surface shape or state |
| --- | --- |
| 1 | Highly lustrous and silk-finished embosses have been formed with good reproducibility. |
| 2 | Lots of non-uniform luster and irregularities in peeling are present. |
| 3 | Lots of non-uniform luster and irregularities in peeling are present. |
| 4 | Highly lustrous and, moreover, good in smoothness. |
| 5 | Lots of non-uniform luster and irregularities in peeling are present. |

As is apparent from the results shown in Table 1, it is seen that Sample Nos. 1 and 4 whose coated surfaces have been irradiated with electron beams prior to embossing steps have embossed faces of very good quality.

EXAMPLE 3

| | |
| --- | --- |
| Unsaturated polyester (as disclosed in Synthesis Example 1 set forth in Japanese Unexamined Publication No. 7473/1979) | 35 wt. % |
| Ethylene glycol diacrylate | 10 wt. % |
| Trimethylolpropane triacrylate | 20 wt. % |
| Titanium dioxide (anatase type) | 35 wt. % |

A composition made of the above was dispersed in a ball mill for 24 hours, and then both surfaces of a photographic raw paper prepared by a conventional method and having a weighed amount of 160 g/m² were coated with it, to have the coated thickness of about 30 μm each. According to the example shown in FIG. 5, both the coated layers thus formed were simultaneously subjected to primary irradiation of electron beams in a nitrogen gas atmosphere and under an accelerated voltage, in the manner that the absorbed dose of the electron beams reached 0.5 Mrad on each coated layer.

Then, the surface of one of the coated layers was brought into contact with a roller embossed on its surface with silk patterns to effect embossing on the coated layer, which was thereafter peeled off from the roller. Subsequently, the coated layer on the opposite side was brought into contact with a roller applied on its surface with mirror face finishing to make smooth the surface of the coated layer, and immediately thereafter, both of the coated layers were simultaneously subjected to secondary irradiation of electron beams in a nitrogen gas atmosphere in the manner that the absorbed dose of the electron beams reached 3 Mrad, and then, after having cured, rolled up.

Specimen thus obtained is designated as Sample No. 6.

Comparative Examples 4 and 5

Example 3 was repeated, except that the primary irradiation was not carried out. Specimen thus obtained is designated as Sample No. 7.

Example 3 was further repeated, except that the secondary irradiation was not carried out. Specimen thus obtained is designated as Sample No. 8.

Surface shapes or state of these samples were observed. Results are shown in Table 2.

TABLE 2

| Sample No. | Surface shape or state |
| --- | --- |
| 6 | Highly lustrous and silk-finished embosses have been sharply reproduced on the surface of one of the coated layers; the surface of the other side coated layer is highly lustrous and satisfactorily smooth. |
| 7 | Lots of non-uniform luster and irregularities in peeling are present. |
| 8 | The surfaces remain sticky. |

From the above results, it is seen that the both-face embossing of very good quality can be effected only when both the primary and secondary irradiation are carried out.

We claim:

1. A method of producing a support for a photographic paper, which comprises applying primary irradiation of electron beams to at least one coated layer formed on one side or both sides of a substrate and curable by irradiation of electron beams thereafter, bringing the surface of said at least one coated layer into contact with a form member having shapes on the surface thereof and peeling off said coated layer from the form member, followed by applying secondary irradiation of electron beams to the coated layer; said primary irradiation being carried out so that the surface of the coated layer may hold shapes substantially corresponding to said shapes on the surface of the form member at the stage where the coated layer has been peeled off from the form member.

2. The method according to claim 1, wherein said primary irradiation is carried out in an abosrbed dose of from about 0.01 to 10 Mrad and said secondary irradiation of from about 0.5 to 15 Mrad.

3. The method according to claim 1, wherein said coated layer comprises a compound having two or more unsaturated double bond and having number average molecular weight ranging from about 500 to 20,000.

4. The method according to claim 3, wherein said compound is selected from the group consisting of unsaturated polyesters, modified unsaturated polyesters, polyester acrylates, epoxy acrylates, silicone acrylates, urethane acrylates, and butadiene series polymers.

5. The method according to claim 3, wherein the coated layer further comprises an inorganic white pigment in such an amount that the weight ratio of said compound to said pigment is in the range of from 10:1 to 1:1.

6. The method according to claim 5, wherein said pigment is selected from the group consisting of $TiO_2$, $ZnO_2$, $SiO_2$, $BaSO_4$, $CaSO_4$, $CaCO_3$, talc and clay.

7. The method according to claim 3, wherein the coated layer further comprises a vinyl monomer in such an amount that the weight ratio of said monomer to said compound is in the range of from 1:10 to 10:1.

8. The method according to claim 7, wherein said monomer is selected from the group consisting of methyl acrylate, ethyl acrylate, butyl acrylate, 2-ethylhexyl methacrylate, 2-hydroxyethyl acrylate, 2-hydroxyethyl methacrylate, glycidylmethacrylate, n-hexyl acrylate, lauryl acrylate, 1,6-hexanediol diacrylate, 1,6-hexanediol dimethacrylate, neopentyl glycol, 1,4-butanediol diacrylate, ethylene glycol diacrylate, polyethylene glycol diacrylate, pentaerithritol diacrylate, divinylbenzene, trimethylolpropane triacrylate, trimethylolpropane trimethacrylate, pentaerithritol triacrylate, dipentaerithritol hexaacrylate and an acrylic acid ester of ethylene diamine.

9. The method according to claim 1, wherein said substrate is a paper having thickness of from about 80 to 250 μm.

10. The method according to claim 1, wherein said irradiation is carried out by use of an electron beam accelerator having an acceleration voltage of from about 100 to 1,000 kV.

11. The method according to claim 1, wherein said coated layer has the coating thickness of from about 3 to 80 μm.

12. The method according to claim 1, wherein said form member is a roll.

13. The method according to claim 12, wherein said roll is a roll having a mirror finished surface.

14. The method according to claim 12, wherein said roll is a roll having a concavo-convex surface.

15. The method according to claim 1, wherein said primary irradiation of electron beams is carried out from a position where an electron beam accelerator for the secondary irradiation is located, with use of such a dose of electron beams that the electron beams used for the secondary irradiation may transmit through the substrate and be absorbed by the coated layer where the primary irradiation is carried out.

16. The method according to claim 1, wherein said primary irradiation of electron beams is applied to coated layers formed on both sides of the substrate, bringing each of the surfaces of said coated layers into contact with a form member and then peeling it from the form member, followed by applying secondary irradiation of electron beams to the coated layers.

17. The method according to claim 16, wherein said primary irradiation of electron beams is carried out from a position where an electron beam accelerator for the secondary irradiation is located, with use of such a dose of electron beams that the electron beams used for the secondary irradiation may transmit through the substrate and be absorbed by the coated layer where the primary irradiation is to be carried out.

* * * * *